(12) United States Patent
Ringseth et al.

(10) Patent No.: US 8,713,039 B2
(45) Date of Patent: *Apr. 29, 2014

(54) CO-MAP COMMUNICATION OPERATOR

(75) Inventors: Paul F. Ringseth, Bellevue, WA (US);
Yosseff Levanoni, Redmond, WA (US);
Lingli Zhang, Sammamish, WA (US);
Weirong Zhu, Kirkland, WA (US);
Donald J. McCrady, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

This patent is subject to a terminal disclaimer.

(21) Appl. No.: 12/977,406

(22) Filed: Dec. 23, 2010

(65) Prior Publication Data

US 2012/0166444 A1 Jun. 28, 2012

(51) Int. Cl.
*G06F 17/30* (2006.01)
*G06F 17/00* (2006.01)
*G06F 9/44* (2006.01)
*G06F 9/45* (2006.01)

(52) U.S. Cl.
CPC ............... *G06F 17/30* (2013.01); *G06F 17/00* (2013.01); *G06F 9/44* (2013.01)
USPC ........... 707/764; 707/602; 707/741; 707/748; 717/133; 717/146

(58) Field of Classification Search
CPC ............. G06F 17/30; G06F 8/41; G06F 8/45; G06F 9/45; G06F 17/00; G06F 9/44
USPC ................. 717/101, 108, 113–116, 119, 122, 717/131–136, 165, 156–157, 145–147; 707/791–793, 797–802, 602, 741–746, 707/748–750, 756, 764; 712/201–203
See application file for complete search history.

(56) References Cited

U.S. PATENT DOCUMENTS

| | | | | |
|---|---|---|---|---|
| 6,433,802 | B1 * | 8/2002 | Ladd ............................. | 715/853 |
| 8,402,450 | B2 * | 3/2013 | Ringseth et al. .............. | 717/146 |
| 2002/0019971 | A1 * | 2/2002 | Zygmont et al. ................... | 717/1 |
| 2005/0028141 | A1 * | 2/2005 | Kurhekar et al. ............. | 717/119 |
| 2006/0276998 | A1 * | 12/2006 | Gupta et al. ................... | 702/182 |
| 2007/0169061 | A1 * | 7/2007 | Bera et al. ...................... | 717/160 |
| 2008/0162385 | A1 * | 7/2008 | Madani et al. .................. | 706/12 |
| 2009/0089560 | A1 * | 4/2009 | Liu et al. ....................... | 712/226 |

(Continued)

OTHER PUBLICATIONS

R Jagannathan et al. "GLU__A High__Level System for Granular Data__Parallel Programming",Oct. 1995 pp. 1-25.*

(Continued)

*Primary Examiner* — Srirama Channavajjala
(74) *Attorney, Agent, or Firm* — Kevin Sullivan; Brian Haslam; Micky Minhas (57) ABSTRACT

A high level programming language provides a co-map communication operator that maps an input indexable type to an output indexable type according to a function. The function maps an index space corresponding to the output indexable type to an index space corresponding to the input indexable type. By doing so, the co-map communication operator lifts a function on an index space to a function on an indexable type to allow composability with other communication operators.

16 Claims, 3 Drawing Sheets

(56) References Cited

U.S. PATENT DOCUMENTS

| | | | |
|---|---|---|---|
| 2009/0089767 A1 | 4/2009 | Daynes et al. | |
| 2009/0204789 A1 | 8/2009 | Gooding et al. | |
| 2010/0235815 A1* | 9/2010 | Maybee et al. | 717/125 |
| 2010/0241646 A1 | 9/2010 | Friedman | |
| 2010/0241827 A1 | 9/2010 | Yu | |
| 2010/0293534 A1 | 11/2010 | Andrade et al. | |
| 2011/0276789 A1* | 11/2011 | Chambers et al. | 712/220 |

OTHER PUBLICATIONS

Mark Chu-Carroll et al. "Design and Implementation of a General Purpose Parallel Programming System", Department of Computer and Information Sciences University of Delaware, Nov. 14, 1995, pp. 1-9.*

Diaconescu, Roxana et al. "Reusable and Extensible High Level Data Distributions", Workshop on Patterns in High Performance Computing, May 4-6, 2005, University of Illinois at Urbana-Champaign, pp. 1-10.*

Kuei-Ping Shih et al. "Efficient Index Generation for Compiling Two-Level Mappings in Data-Parallel Programs", Journal of Parallel and Distributed Computing 60, 189_216 (2000).*

Petricek, Tomas, "Accelerator and F# (III.): Data-Parallel programs using F# quotations". <<http://tomasp.net/blog/accelerator-dataparallel.aspx>> Retrieved Oct. 20, 2010. pp. 2-9.

"Array Building Blocks: A Flexible Parallel Programming Model for Multicore and Many-Core Architectures" <<http://www.drdobbs.com/go-parallel/article/showArticle.jhtml:jsessionid=51NYX1OZXP Retrieved Oct. 20, 2010. pp. 1-4.

Hains, et al., "Array Structures and Data-Parallel Algorithms" Laboratoire d'informatique fondamentale d'Orleans, BP6759-45067 Orleans Cedex 2, France. pp. 1-8.

Mattson, Tim. "Data Parallel Design Patterns", <<http://parlab.eecs.berkeley.edu/wiki/_media/patterns/data_parallel.pdf Retrieved Dec. 2010. pp. 1-7.

Keller, et al., "Regular, Shape-polymorphic, Parallel Arrays in Haskell", <<http://www.cse.unsw.edu.au/~chak/papers/KCLPL10.html Retrieved Dec. 2010. pp. 1-12.

Hermann, et al., "Size Inference of Nested Lists in Functional Programs" Fakultat fur Mathematik und Informatik, Universitat Passau, Germany. pp. 1-16.

* cited by examiner

CO-MAP COMMUNICATION OPERATOR

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier.

Data parallel algorithms often operate on large computational spaces. The computational spaces usually include some form of indexing to allow individual data elements to be accessed and operated on. At times, however, data parallel algorithms may generate a desired result by operating on the indexing structures of the computational spaces rather than the data elements.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides a co-map communication operator that maps an input indexable type to an output indexable type according to a function. The function maps an index space corresponding to the output indexable type to an index space corresponding to the input indexable type. By doing so, the co-map communication operator lifts a function on an index space to a function on an indexable type to allow composability with other communication operators.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
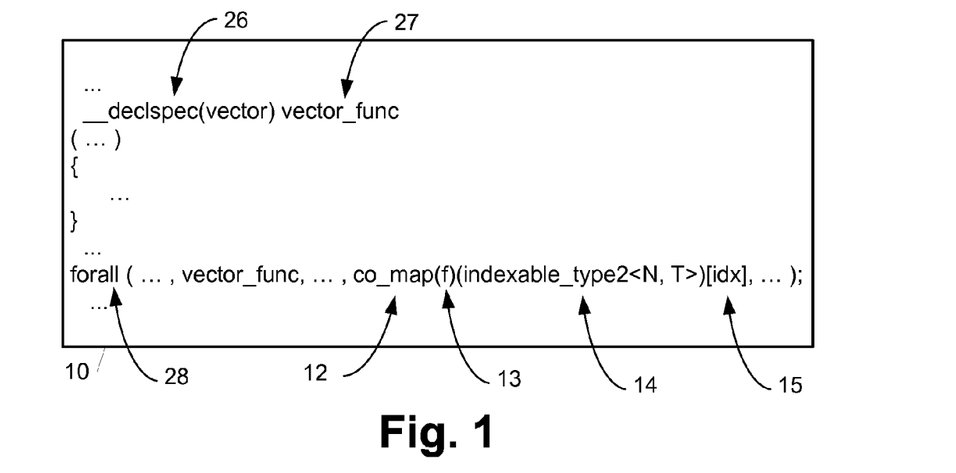
FIG. 1 is a computer code diagram illustrating an embodiment of code with a co-map communication operator.

FIG. 1 is a computer code diagram illustrating an embodiment of code 10 with a co-map communication operator 12. When compiled and executed, co-map communication operator 12 maps an input indexable type 14 to an output indexable type 18 (defined below) according to a function 13. Function 13 maps an index space 15 corresponding to output indexable type 18 to an index space 17 corresponding to input indexable type 14. By doing so, co-map communication operator 12 lifts function 13 on index space 15 to a function on input indexable type 14 to allow composability with other communication operators.

Figure 4:
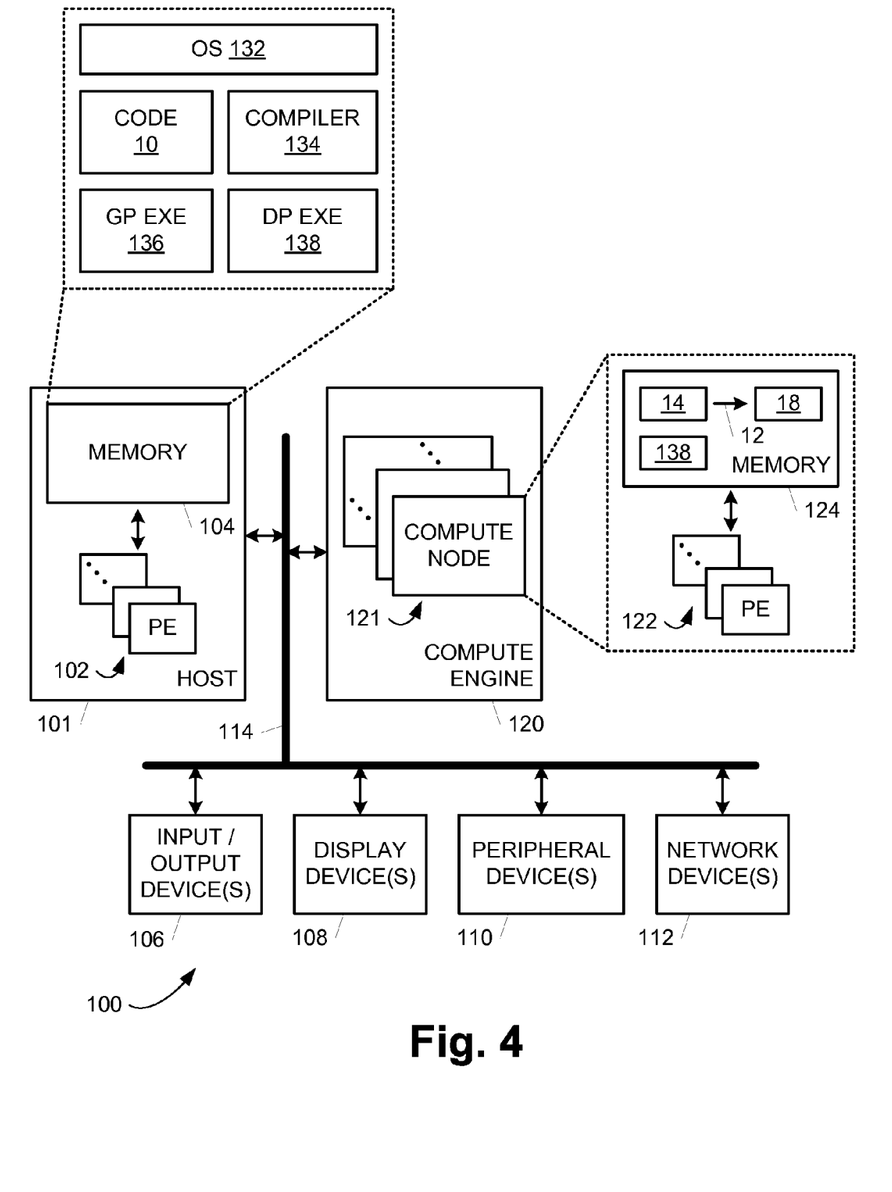
FIG. 4 is a block diagram illustrating an embodiment of a computer system configured to compile and execute data parallel code that includes a co-map communication operator.

Code 10 includes a sequence of instructions from a high level general purpose or data parallel programming language that may be compiled into one or more executables (e.g., DP executable 138 shown in FIG. 4) for execution by one or more DP optimal compute nodes (e.g., DP optimal compute nodes 121 shown in FIG. 4).

In one embodiment, code 10 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. DP optimal compute nodes are typically graphic processing units (GPUs) or SIMD units of general purpose processors but may also include the scalar or vector execution units of general purpose processors, field programmable gate arrays (FPGAs), or other suitable devices in some computing environments. Using the GP language, a programmer may include both general purpose processor and DP source code in code 10 for execution by general purpose processors and DP compute nodes, respectively, and coordinate the execution of the general purpose processor and DP source code. Code 10 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language implementation may include rich linking capabilities that allow different parts of a program to be included in different modules. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 10 includes a sequence of instructions from a high level data parallel programming language (hereafter DP language) that form a program. A DP language provides a specialized language for programming a DP optimal compute node in a computing environment with one or more DP optimal compute nodes. Using the DP language, a programmer generates DP source code in code 10 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 10 may represent any suitable type of DP source code in this embodiment, such as an application, a library function, or an operating system service.

Code 10 includes code portions designated for execution on a DP optimal compute node. In the embodiment of FIG. 1 where code 10 is written with a GP language, the GP language allows a programmer to designate DP source code using an annotation 26 (e.g., _declspec(vector) . . . ) when defining a vector function. The annotation 26 is associated with a function name 27 (e.g., vector_func) of the vector function that is intended for execution on a DP optimal compute node. Code 10 may also include one or more invocations 28 of a vector function (e.g., scan . . . , vector_func, . . . ) at a call site (e.g., forall, reduce, scan, or sort). A vector function corresponding to a call site is referred to as a kernel function. A kernel function may call other vector functions in code 10 (i.e., other DP source code) and may be viewed as the root of a vector function call graph. A kernel function may also use user-defined types (e.g., classes or structs) defined by code 10. The types may or may not be annotated as DP source code. In other embodiments, other suitable programming language constructs may be used to designate portions of code 10 as DP source code and/or general purpose processor code. In addition, annotations 26 may be omitted in embodiments where code 10 is written in a DP language.

Figure 2:
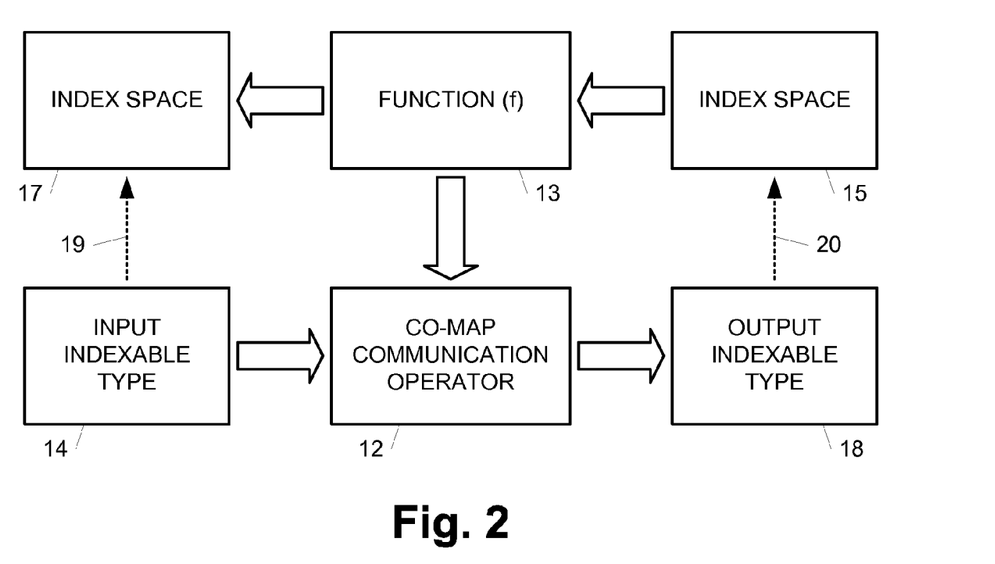
FIG. 2 is a block diagram illustrating an embodiment of applying a co-map communication operator to an input indexable type.

FIG. 2 is a block diagram illustrating an embodiment of applying co-map communication operator 12 to an input indexable type 14 according to function 13 to generate an output indexable type 18. A subscript operator of an indexable type will be also referred to herein as an index operator. As used herein, an indexable type is any data type that implements one or more subscript operators along with a rank, which is a non-negative integer, and a type which is denoted element_type. If index<N> is a type that represents N-tuples of integers (viz., any type of integral data type), an instance of index<N> is a set of N integers {i0, i1, . . . , im} where m is equal to N−1 (i.e., an N-tuple). An index operator of rank N takes an N-tuple instance of index<N> and associates the instance with another instance of a type called the element type where the element type defines each element in an indexable type. In one embodiment, an indexable type defines one or more of the following operators:

element_type operator[ ] (index_declarator);
    const element_type operator[ ] (index_declarator) const;
    element_type& operator[ ] (index_declarator);
    const element_type& operator[ ] (index_declarator) const;
    element_type&& operator[ ] (index_declarator); or
    const element_type&& operator[ ] (index_declarator) const;

where index_declarator takes the form of at least one of:
    const index<rank>& idx;
    const index<rank> idx;
    index<rank>& idx;
    index<rank> idx.

In other embodiments the operators may be functions, functors or a more general representation. An indexable type's shape is the set of index<rank> for which one of the above subscript operators is defined. An indexable type typically has a shape that is a polytope—i.e., an indexable type may be algebraically represented as the intersection of a finite number of half-spaces formed by linear functions of the coordinate axes.

With reference to FIGS. 1 and 2, the high level language of code 10 provides a co-map communication operator 12 that transforms an index space 15 (e.g., idx in the example of FIG. 1) according to a function 13 (e.g., the function f in the example of FIG. 1) and an input indexable type 14 (e.g., the indexable type indexable_type2 in the example of FIG. 1) to generate an output indexable type 18 in a data parallel computing environment. Input indexable type 14 has a rank (e.g., rank N in the example of FIG. 1) and an element type (e.g., element type T in the example of FIG. 1) where an element of input indexable type 14 defines a function 'alpha'.

Co-map communication operator 12 applies function 13 to index space 15 to map index space 15 to an index space 17. For example, function f may be represented as a transformation of a set of M index points i(1) to i(M) of index space 15 (i.e., index<M>) to a set of N index points j(1) to j(N) of index space 17 (i.e., index<N>), where M may or may not be equal to N, as follows.

f: index<M>=>index<N>

Co-map communication operator 12 may be represented as:
    co_map(f): indexable_type2=>indexable_type1
where the definition of co_map(f) is:
    because an indexable type is uniquely defined by the behavior of its subscript operator, let alpha be an element of indexable_type2 and therefore co_map(f)(alpha) is an element of indexable_type1, such that:
        for each idx in index<M>,
            co_map(f)(alpha)(idx)
        is defined to be equal to
            alpha(f(idx)).

The above is referred to as pre-composition by 'f' by noting that the direction of 'f' is reversed.

Co-map communication operator 12 forms a higher-order function by taking function 13 as an argument. By doing so, co-map communication operator 12 lifts function 13 to a function on input indexable type 14. As shown in FIG. 2, input indexable type 14 (i.e., indexable_type2) corresponds to index space 17 (i.e., index<N>) as indicated by a dashed arrow 19, which by the definition of indexable type, means that indexable_type2 has index operators as follows where '@' represents lvalue-reference, rvalue-reference or by-value return semantics.

element-type@ operator[ ] (const index<N>& idx);

Likewise, output indexable type 18 (i.e., indexable_type1) corresponds to index space 15 (i.e., index<M>) as indicated by a dashed arrow 20, which by the definition of indexable type, means that indexable_type1 has index operators as follows where '@' represents lvalue-reference, rvalue-reference or by-value return semantics.

element-type@ operator[ ] (const index<M>& idx);

Because output indexable type 18 may be operated on by other communication operators, co-map communication operator 12 is composable with the other communication operators. To allow co-map communication operator 12 to be fully composable with other communication operators, four index transformations (i.e., transform, transform_offset, transform_extent, and co_transform_extent) may be specified according to one embodiment. The transform index transformation maps index space 15 (i.e., index<_Rank1>) to index space 17 (i.e., index<_Rank2>) and may be represented as follows where _Parent represents input indexable type 14, _Index is an element of index space 15, _Rank1 represents the rank of output indexable type 18, _Rank2 represents the rank of input indexable type 14, and '@' represents lvalue-reference, rvalue-reference or by-value return semantics.

// index op=>return _Parent[transform(_Index)];
const index<_Rank2>@ transform(const index<_Rank1>& _Index) const;

The transform_offset index transformation transforms an offset into indexable type 14 into an offset into output indexable type 18 and may be represented as follows.

// _Parent.offset=transform_offset(offset);
const index<_Rank2>@ transform_offset(const index<_Rank1>& _Index) const;

The transform_extent index transformation transforms the extent of indexable type 14 into the extent of output indexable type 18 and may be represented as follows.

// _Parent.extent=transform_extent(extent);
const extent<_Rank2>@ transform_extent(const extent<_Rank1>& ext) const;

The co_transform_extent index transformation transforms the extent of output indexable type 18 into the extent of indexable type 14 and may be represented as follows.

// extent=cotransform_extent(_Parent.extent);
const extent<_Rank1>@ cotransform_extent(const extent<_Rank2>& ext) const;

The above four index transformations may appear in a _Transform_index object passed to co-map communication operator 12. The transform_offset, transform_extent, and co_transform_extent index transformations allow communication operators that tile, section, or partition an indexable type to be composed with co-map communication operator 12.

Using template meta-programming techniques, the index operators of output indexable type 18 (viz., the return type of the co-map communication operator 12), return by-lvalue-reference when applied to an input indexable type 14, that returns by-lvalue-reference, by-rvalue-reference when applied to an input indexable type 14 that returns by-rvalue-reference, or by-value when applied to an input indexable type 14 that returns by-value.

Example implementations of co-map communication operator 12 will now be described.

As a first code example that follows, the index transformations are used to implement co-map communication operator 12 to form a project communications operator, _project, that inserts a specified dimension into an indexable type. For example:

_project<1>(17): (y, x)=>(y, 17, x)
_project<0>(13): (y, x)=>(y, x, 13)

Let field<2, _Element_type> be the input indexable type. Let f be an element of the input indexable type. Then the co-map communication operator 12 may be represented as follows.

co_map(_project<1>(17))(f): (y, x)=>f(_project<1>(17)(y, x))
co_map(_project<0>(13))(f): (y, x)=>f(_project<0>(13)(y, x))

which is the same as:

co_map(_project<1>(17))(f): (y, x)=>f(y, 17, x)
co_map(_project<0>(13))(f): (y, x)=>f(y, x, 13)

The project functor with the index transformation may be expressed as follows.

```
//
// project_functor -- _M_bound is Parent.get_extent(_Dim)
//
template <int _Dim>
struct project_functor {
   project_functor(index_t _Val, extent_t _Bound)
      : _M_value(_Val), _M_bound(_Bound)
   {
   }
   template<int _Rank, template <int> class _Index_type>
   const _Index_type<_Rank+1> transform_pattern(const _Index_type
<_Rank>& _Index) const {
      static_assert(_Dim >= 0 && _Dim <= _Rank && _Rank > 0, "illegal dimension for project");
      _Index_type<_Rank> _idx;
      for (int i = 0; i < _Dim; ++i)
         _idx[i] = _Index[i];
      _Index[_Dim] = _M_value;
      for (int i = _Dim; i < _Rank-1; ++i)
         _idx[i+1] = _Index [i];
      return _idx;
   }
   template<int _Rank>
   const index<_Rank+1> transform(const index<_Rank>& _Index) const {
      return transform_pattern(_Index);
   }
   template <int _Rank>
   const index<_Rank+1> transform_offset(const index<_Rank>& _Index)
   const {
      return transform_pattern(_Index);
   }
   template <int _Rank>
   const extent<_Rank+1> transform_extent(const extent<_Rank>&
_Extent)
   const {
      return transform_pattern(_Index);
   }
   template<int _Rank>
   const extent<_Rank-1> cotransform_extent(const extent<_Rank>&
   _Extent) const
   {
      static_assert(_Dim >= 0 && _Dim < _Rank && _Rank > 0, "illegal dimension for project");
      extent<_Rank-1> _ext;
      for (int i = 0; i < _Dim; ++i)
         _ext[i] = _Extent[i];
```

```
    for (int i = _Dim; i < _Rank-1; ++i)
        _ext[i] = _Extent[i+1];
    return _ext;
  }
private:
  index_t _M_value;
  extent_t _M_bound;
};
```

When performance is a concern, transform or transform_pattern can be specialized as shown in the following examples.

```
template <>
const index<1> transform<0>(const index<0>& _Index) const {
    static_assert(_Dim == 0, "illegal dimension for project");
    return index<1>(_M_value);
}
template<>
const index<2> transform<1>(const index<1>& _Index) const {
    static_assert(_Dim == 0 || _Dim == 1, "illegal dimension for project");
    if (_Dim == 0)
        return index<2>(_M_value, _Index[0]);
    return index<2>(_Index[0], _M_value);
}
template<>
const index<3> transform<2>(const index<2>& _Index) const {
    static_assert(_Dim >= 0 && _Dim < 3, "illegal dimension for project");
    if (_Dim == 0)
        return index<3>(_M_value, _Index[0], _Index[1]);
    else if (_Dim == 1)
        return index<3>(_Index[0], _M_value, _Index[1]);
    return index<3>(_Index[0], _Index[1], _M_value);
}
template<>
const index<4> transform<3>(const index<3>& _Index) const {
    static_assert(_Dim >= 0 && _Dim < 4, "illegal dimension for project");
    if (_Dim == 0)
        return index<4>(_M_value, _Index[0], _Index[1], _Index[2]);
    else if (_Dim == 1)
        return index<4>(_Index[0], _M_value, _Index[1], _Index[2]);
    else if (_Dim == 2)
        return index<4>(_Index[0], _Index[1], _M_value, _Index[2]);
    return index<4>(_Index[0], _Index[1], _Index[2], _M_value);
}
```

A second code example provides index transformations that implement co-map communication operator 12 to perform a circular shift (i.e., cshift) of an input indexable type 14 in one dimension as follows.

```
template <int _Rank>
_DECLSPEC_VECTOR
const index<_Rank> transform(const index<_Rank>& _Index) const {
    index<2> _idx(_Index);
    _idx[_Dim] = (_idx[_Dim] + _M_value) % _M_bound;
    return _idx;
}
template <int _Rank>
_DECLSPEC_VECTOR
const index<Rank>& transform_offset(const index<Rank>& Index)
const {
    static_assert(_Dim >= 0 && _Dim <= _Rank && _Rank > 0, "illegal values for cshift");
    return _Index;
}
template <int _Rank>
_DECLSPEC_VECTOR
const extent<_Rank> transform_extent(const extent<_Rank>& ext)
const {
    static_assert(_Dim >= 0 && _Dim <= _Rank && _Rank > 0, "illegal values for cshift");
    return ext;
}
template <int _Rank>
_DECLSPEC_VECTOR
const extent<_Rank> cotransform_extent(const extent<_Rank>& ext)
const {
    static_assert(_Dim >= 0 && _Dim <= _Rank && _Rank > 0, "illegal values for cshift");
    return ext;
}
```

Figure 3A:
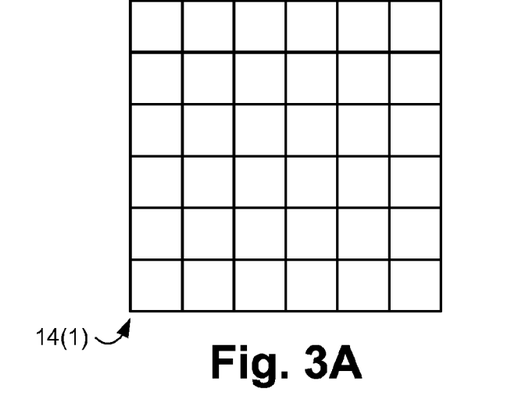
FIGS. 3A-3C is are block diagrams illustrating examples of using a co-map communication operator.
Figure 3B:
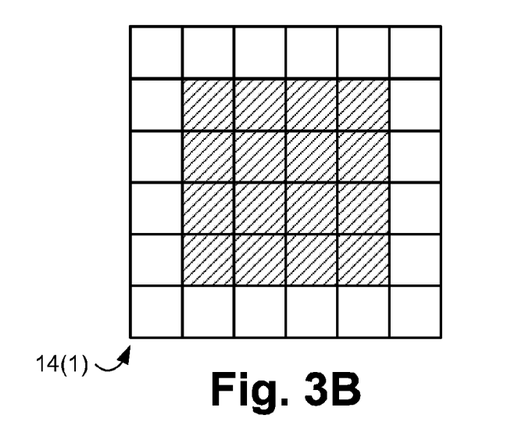
Figure 3C:
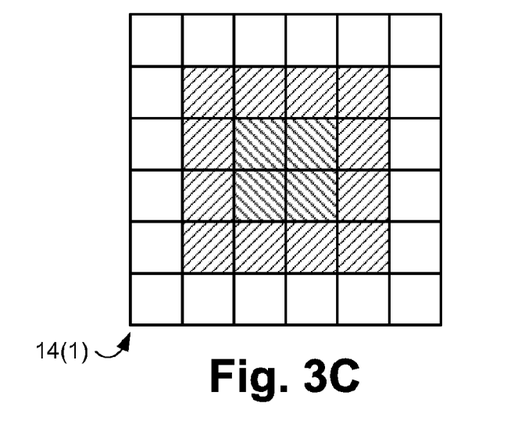

In the following third code example, the index transformations are used to implement co-map communication operator 12 to form an interior communications operator that truncates an input indexable type 14(1) at the boundary by an amount specified by _Delta as illustrated in FIGS. 3A-3C.

```
//
// interior communication operator
//
template <int _Rank, typename _Parent_type>
interior_range<_Parent_type> interior(const_Parent_type& _Parent, const extent<_Rank>& _Delta) {
    return interior_range<_Parent_type>(_Parent, _Delta);
}
```

With an input indexable type 14(1) that forms a 6×6 matrix as shown in FIG. 3A, the output of interior(_Parent, _Delta) is shown as the shaded region in FIG. 3B when _Delta has a value of one for each component as follows.
    extent<2> _Delta(1, 1);
With the interior communications operator, the transform index transformation is the identity because there is nothing to change when viewed from the index operator level. Accordingly, the transform index transformation is as follows.

```
const index<_Rank>& transform(const index<_Rank>& _Index) const {
    return _Index;
}
```

The purpose of the transform_offset index transformation is to represent what happens to an offset vector in the shaded interior of indexable type 14(1) from the point-of-view of the root-parent (i.e., the original indexable type), which, in this example, is the 6×6 matrix shown in FIG. 3A. The sub-object of the shaded interior region of FIG. 3B may be operated on with another interior communications operator to produce the second shaded interior region shown in FIG. 3C. The offset of the second shaded interior region shown in FIG. 3C with respect to the root parent is index<2>(2, 2). When taken with respect to the first shaded interior region shown in FIG. 3B, however, the offset is index<2>(1,1). Accordingly, the transform_offset index transformation is as follows.

```
const index<_Rank> transform_offset(const index<_Rank>& _Index)
const {
    return _Index + _M_delta; // _M_delta = _Delta = (1,1)
}
```

The purpose of the transform_extent index transformation is to represent what happens to the extent of the first shaded interior of indexable type 14(1) shown in FIG. 3B (i.e., a 4×4 matrix) from the point-of-view of the root-parent shown in FIG. 3A. In this example, the transformation between the 4×4 matrix and the 6×6 matrix is by adding the vector 2*_Delta (i.e., 6−4=2*1 and 6−4=2*1) as follows.

```
const extent<_Rank> transform_extent(const extent<_Rank>& _Extent) const {
    return _Extent + 2* _M_delta; // _M_delta = _Delta = (1,1)
}
```

The purpose of the cotransform_extent index transformation is to represent what happens to the extent of root-parent shown in FIG. 3A (i.e., the 6×6 matrix) from the point-of-view of the current child shown as the shaded interior region in FIG. 3B. In this example, the transformation between the 6×6 matrix and the 4×4 matrix is by adding the vector 2*_Delta (i.e., 4−6=−2*1 and 4−6=−2*1) as follows.

```
const extent<_Rank> cotransform_extent(const extent<_Rank>& _Extent) const {
    return _Extent − 2* _M_delta; // _M_delta = _Delta = (1,1)
}
```

In the above, the second shaded interior region shown in FIG. 3C forms a sub-object of the interior object shown as the first shaded interior region shown in FIG. 3B. To create a sub-object of the interior object, the interior object is transformed back to the root-parent as shown in FIG. 3A (e.g., _Parent) and then the transformations are performed to map back to the sub-object level (e.g., _Parent._Parent._Parent). In one embodiment, the sub-object constructor of interior and other co_map communication operators is as follows.

```
//
// restriction operator ctor, for tiling and projection and general sub-object creation
//
template <typename _Other_parent_type>
transform_range(const grid<_Rank>& _Grid, const _Other_parent_type& _Parent)
    : _Parent_type(_Parent) {
    set_offset(_Grid.get_offset( ));
    set_extent(_Grid.get_extent( ));
}
// where set_offset and set_extent look like:
void set_offset(const index<_Rank>& _Offset) {
    _Parent_type::set_offset( m_transformer.transform_offset(_Offset) );
}
void set_extent(const extent<_Rank>& _Extent) {
    _Parent_type::set_extent( m_transformer.transform_extent(_Extent) );
}
```

Thus, when transforming the 6×6 matrix of FIG. 3A to the 4×4 matrix of FIG. 3B to the 2×2 matrix of FIG. 3C (i.e., applying the interior communications operator twice with a delta of (1, 1) each time), it follows that (2×2).set_offset(x, y)=>(4×4).set_offset(x+1, y+1)=>(6×6).set_offset(x+2, y+2)

and (2×2).set_extent(x, y)=>(4×4).set_extent(x+1, y+1)=>(6×6).set_extent(x+2, y+2)

Accordingly, the following code may be used.

```
const extent<_Rank> get_extent( ) const {
    return m_transformer.cotransform_extent(_Parent_type::get_extent( ));
}
```

With the above code, child.get_extent represents the extent of the child object as a transformation of the extent of the root-parent. Thus:

(2×2).get_extent( )=>(4×4).get_extent( )−2*_Delta=> (6×6).get_extent( )−2*_Delta−2*_Delta The interior functor using the above index transformation may be expressed as follows.

```
//
// interior_functor
//
template <int _Rank>
struct interior_functor {
    interior_functor(const extent<_Rank>& _Delta)
        : _M_delta(_Delta)
    {
    }
    const index<_Rank>& transform(const index<_Rank>& _Index) const {
        return _Index;
    }
    const index<_Rank> transform_offset(const index<_Rank>& _Index) const {
        return _Index + _M_delta;
    }
    const extent<_Rank> transform_extent(const extent<_Rank>& _Extent) const {
        return _Extent + 2* _M_delta;
    }
    const extent<_Rank> cotransform_extent(const extent<_Rank>& _Extent) const {
        return _Extent − 2* _M_delta;
    }
private:
    extent<_Rank> _M_delta;
};
```

In the following fourth code example, a transform index transformation implements co-map communication operator 12 that swaps dimensions Dim1 and Dim2 of an input indexable type 14.

```
template <int _Rank>
DECLSPEC_VECTOR
static const index<_Rank> transform(const index< _Rank>& _Index) {
    static_assert(_Dim1 != _Dim2 && _Dim1 >= 0 && _Dim2 >= 0
        && _Dim1 <
    _Rank && _Dim2 < _Rank && _Rank > 0, "illegal values for transpose indices");
    index< _Rank> _idx;
    if (_Dim1 < _Dim2) {
        for (int i = 0; i < _Dim1; ++i)
            _idx[i] = _Index[i];
        for (int i = _Dim1+1; i < _Dim2; ++i)
            _idx[i] = _Index[i];
        for (int i = _Dim2+1; i < _Rank; ++i)
            _idx[i] = _Index[i];
    }else {
        for (int i = 0; i < _Dim2; ++i)
            _idx[i] = _Index[i];
        for (int i = _Dim2+1; i < _Dim1; ++i)
            _idx[i] = _Index[i];
        for (int i = _Dim1+1; i < _Rank; ++i)
            _idx[i] = _Index[i];
    }
```

```
    _idx[_Dim1] = _Index[_Dim2];
    _idx[_Dim2] = _Index[_Dim1];
    return _idx;
}
```

In this case, the above code is also the pattern for the transform_offset, transform_extent, and co_transform_extent index transformations.

FIG. 4 is a block diagram illustrating an embodiment of a computer system 100 configured to compile and execute data parallel code 10 that includes a co-map communication operator 12.

Computer system 100 includes a host 101 with one or more processing elements (PEs) 102 housed in one or more processor packages (not shown) and a memory system 104. Computer system 100 also includes zero or more input/output devices 106, zero or more display devices 108, zero or more peripheral devices 110, and zero or more network devices 112. Computer system 100 further includes a compute engine 120 with one or more DP optimal compute nodes 121 where each DP optimal compute node 121 includes a set of one or more processing elements (PEs) 122 and a memory 124 that stores DP executable 138.

Host 101, input/output devices 106, display devices 108, peripheral devices 110, network devices 112, and compute engine 120 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a smart phone, a personal digital assistant (PDA), a mobile telephone, and an audio/video device. The components of computer system 100 (i.e., host 101, input/output devices 106, display devices 108, peripheral devices 110, network devices 112, interconnections 114, and compute engine 120) may be contained in a common housing (not shown) or in any suitable number of separate housings (not shown).

Processing elements 102 each form execution hardware configured to execute instructions (i.e., software) stored in memory system 104. The processing elements 102 in each processor package may have the same or different architectures and/or instruction sets. For example, the processing elements 102 may include any combination of in-order execution elements, superscalar execution elements, and data parallel execution elements (e.g., GPU execution elements). Each processing element 102 is configured to access and execute instructions stored in memory system 104. The instructions may include a basic input output system (BIOS) or firmware (not shown), an operating system (OS) 132, code 10, compiler 134, GP executable 136, and DP executable 138. Each processing element 102 may execute the instructions in conjunction with or in response to information received from input/output devices 106, display devices 108, peripheral devices 110, network devices 112, and/or compute engine 120.

Host 101 boots and executes OS 132. OS 132 includes instructions executable by the processing elements to manage the components of computer system 100 and provide a set of functions that allow programs to access and use the components. In one embodiment, OS 132 is the Windows operating system. In other embodiments, OS 132 is another operating system suitable for use with computer system 100.

When computer system executes compiler 134 to compile code 10, compiler 134 generates one or more executables—e.g., one or more GP executables 136 and one or more DP executables 138. In other embodiments, compiler 134 may generate one or more GP executables 136 to each include one or more DP executables 138 or may generate one or more DP executables 138 without generating any GP executables 136. GP executables 136 and/or DP executables 138 are generated in response to an invocation of compiler 134 with data parallel extensions to compile all or selected portions of code 10. The invocation may be generated by a programmer or other user of computer system 100, other code in computer system 100, or other code in another computer system (not shown), for example.

GP executable 136 represents a program intended for execution on one or more general purpose processing elements 102 (e.g., central processing units (CPUs)). GP executable 136 includes low level instructions from an instruction set of one or more general purpose processing elements 102.

DP executable 138 represents a data parallel program or algorithm (e.g., a shader) that is intended and optimized for execution on one or more data parallel (DP) optimal compute nodes 121. In one embodiment, DP executable 138 includes DP byte code or some other intermediate representation (IL) that is converted to low level instructions from an instruction set of a DP optimal compute node 121 using a device driver (not shown) prior to being executed on the DP optimal compute node 121. In other embodiments, DP executable 138 includes low level instructions from an instruction set of one or more DP optimal compute nodes 121 where the low level instructions were inserted by compiler 134. Accordingly, GP executable 136 is directly executable by one or more general purpose processors (e.g., CPUs), and DP executable 138 is either directly executable by one or more DP optimal compute nodes 121 or executable by one or more DP optimal compute nodes 121 subsequent to being converted to the low level instructions of the DP optimal compute node 121.

Computer system 100 may execute GP executable 136 using one or more processing elements 102, and computer system 100 may execute DP executable 138 using one or more PEs 122 as described in additional detail below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 132, code 10, compiler 134, GP executable 136, and DP executable 138. The instructions are executable by computer system 100 to perform the functions and methods of OS 132, code 10, compiler 134, GP executable 136, and DP executable 138 as described herein. Memory system 104 stores instructions and data received from processing elements 102, input/output devices 106, display devices 108, peripheral devices 110, network devices 112, and compute engine 120. Memory system 104 provides stored instructions and data to processing elements 102, input/output devices 106, display devices 108, peripheral devices 110, network devices 112, and compute engine 120. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Compute engine 120 is configured to execute DP executable 138. Compute engine 120 includes one or more compute nodes 121. Each compute node 121 is a collection of computational resources that share a memory hierarchy. Each compute node 121 includes a set of one or more PEs 122 and a memory 124 that stores DP executable 138. PEs 122 execute DP executable 138 and store the results generated by DP executable 138 in memory 124. In particular, PEs 122 execute DP executable 138 to apply a co-map communication operator 12 to an input indexable type 14 to generate an output indexable type 18 as shown in FIG. 4 and described in additional detail above.

A compute node 121 that has one or more computational resources with a hardware architecture that is optimized for data parallel computing (i.e., the execution of DP programs or algorithms) is referred to as a DP optimal compute node 121. Examples of a DP optimal compute node 121 include a node 121 where the set of PEs 122 includes one or more GPUs and a node 121 where the set of PEs 122 includes the set of SIMD units in a general purpose processor package. A compute node 121 that does not have any computational resources with a hardware architecture that is optimized for data parallel computing (e.g., processor packages with only general purpose processing elements 102) is referred to as a non-DP optimal compute node 121. In each compute node 121, memory 124 may be separate from memory system 104 (e.g., GPU memory used by a GPU) or a part of memory system 104 (e.g., memory used by SIMD units in a general purpose processor package).

Host 101 forms a host compute node that is configured to provide DP executable 138 to a compute node 121 for execution and receive results generated by DP executable 138 using interconnections 114. The host compute node includes is a collection of general purpose computational resources (i.e., general purpose processing elements 102) that share a memory hierarchy (i.e., memory system 104). The host compute node may be configured with a symmetric multiprocessing architecture (SMP) and may also be configured to maximize memory locality of memory system 104 using a non-uniform memory access (NUMA) architecture, for example.

OS 132 of the host compute node is configured to execute a DP call site to cause a DP executable 138 to be executed by a DP optimal or non-DP optimal compute node 121. In embodiments where memory 124 is separate from memory system 104, the host compute node causes DP executable 138 and one or more indexable types 14 to be copied from memory system 104 to memory 124. In embodiments where memory system 104 includes memory 124, the host compute node may designate a copy of DP executable 138 and/or one or more indexable types 14 in memory system 104 as memory 124 and/or may copy DP executable 138 and/or one or more indexable types 14 from one part of memory system 104 into another part of memory system 104 that forms memory 124. The copying process between compute node 121 and the host compute node may be a synchronization point unless designated as asynchronous.

The host compute node and each compute node 121 may concurrently execute code independently of one another. The host compute node and each compute node 121 may interact at synchronization points to coordinate node computations.

In one embodiment, compute engine 120 represents a graphics card where one or more graphics processing units (GPUs) include PEs 122 and a memory 124 that is separate from memory system 104. In this embodiment, a driver of the graphics card (not shown) may convert byte code or some other intermediate representation (IL) of DP executable 138 into the instruction set of the GPUs for execution by the PEs 122 of the GPUs.

In another embodiment, compute engine 120 is formed from the combination of one or more GPUs (i.e. PEs 122) that are included in processor packages with one or more general purpose processing elements 102 and a portion of memory system 104 that includes memory 124. In this embodiment, additional software may be provided on computer system 100 to convert byte code or some other intermediate representation (IL) of DP executable 138 into the instruction set of the GPUs in the processor packages.

In further embodiment, compute engine 120 is formed from the combination of one or more SIMD units in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the SIMD units in the processor packages.

In yet another embodiment, compute engine 120 is formed from the combination of one or more scalar or vector processing pipelines in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the scalar processing pipelines in the processor packages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage device storing computer-executable instructions that, when executed by a computer system, cause the computer system to perform a method for generating data parallel executable code from data parallel source code, comprising:

identifying a co-map communication operator in data parallel source code that is configured for execution on one or more data parallel compute nodes, the co-map communication operator being configured to receive as inputs (i) an input indexable type in a first index space and (ii) a function that operates on the first index space, and to transform the input indexable type into an output indexable type in a second index space based on the function, wherein the input indexable type and the output indexable type are data types that implement one or more subscript operators along with a rank, wherein the co-map communication operator is configured to be fully composable with other communication operators by being configured to be specified with each of the following transformations: a first transformation that maps the second index space to first index space, a second transformation that transforms an offset into the input indexable type into an offset into the output indexable type, a third transformation that transforms an extent of the input indexable type into an extent of the output indexable type, and a fourth transformation that transforms the extent of the output indexable type into the extent of the input indexable type, and wherein the co-map communications operator comprises a 'swap' communications operator that includes an index transformation that swaps dimensions of the input indexable type to transform the input indexable type into the output indexable type;

based on identifying the co-map communication operator, mapping the input indexable type to the output indexable type by applying the function to the first index space, thereby lifting the function from a function that operates on an index space to a function that operates on an indexable type; and performing a data parallel algorithm using the output indexable type.

2. The computer readable storage device of claim 1, wherein the input indexable type has a first rank and a first element type, and wherein the output indexable type has a second rank and a second element type.

3. The computer readable storage device of claim 1, further comprising:

applying a second communications operator to the output indexable type.

4. The computer readable storage device of claim 1, wherein the data parallel source code is written in a programming language with data parallel extensions.

5. The computer readable storage device of claim 1, wherein the data parallel source code is written in a high level data parallel programming language.

6. The computer readable storage device of claim 1, wherein the one or more data parallel compute nodes include at least one graphics processing unit.

7. The computer readable storage device of claim 1, wherein the one or more data parallel compute nodes include at least one general purpose processor.

8. A method for generating data parallel executable code from data parallel source code, the method comprising:

identifying, at a computer system that includes one or more processors, a co-map communication operator in data parallel source code that is configured for execution on one or more data parallel compute nodes, the co-map communication operator being configured to receive as inputs (i) an input indexable type in a first index space and (ii) a function that operates on the first index space, and to transform the input indexable type into an output indexable type in a second index space based on the function, wherein the input indexable type and the output indexable type are data types that implement one or more subscript operators along with a rank, wherein the co-map communication operator is configured to be fully composable with other communication operators by being configured to be specified with each of the following transformations: a first transformation that maps the second index space to first index space, a second transformation that transforms an offset into the input indexable type into an offset into the output indexable type, a third transformation that transforms an extent of the input indexable type into an extent of the output indexable type, and a fourth transformation that transforms the extent of the output indexable type into the extent of the input indexable type, and wherein the co-map communications operator comprises a 'swap' communications operator that includes an index transformation that swaps dimensions of the input indexable type to transform the input indexable type into the output indexable type; and generating, at the computer system, data parallel executable code from the data parallel source code, including mapping the input indexable type to the output indexable type by applying the function to the first index space, thereby lifting the function from a function that operates on an index space to a function that operates on an indexable type.

9. The method of claim 8, wherein the input indexable type has a first rank and a first element type, and wherein the output indexable type has a second rank and a second element type.

10. The method of claim 8, further comprising:

generating, at the computer system, data parallel executable code from the data parallel source code such that the data parallel executable code applies a second communication operator to the output indexable type.

11. The method of claim 8, wherein the data parallel source code is written in a high level general purpose programming language with data parallel extensions.

12. The method of claim 8, wherein the data parallel source code is written in a high level data parallel programming language.

13. The method of claim 8, wherein the one or more data parallel compute nodes include at least one graphics processing unit.

14. The method of claim 8, wherein the one or more data parallel compute nodes include at least one general purpose processor.

15. A computer system, comprising:

one or more processors; and one or more computer readable storage medium storing computer-executable instructions that, when executed by the one or more processors, cause the computer system to perform a method for generating data parallel executable code from data parallel source code, the method comprising:

identifying a co-map communication operator in data parallel source code written in a high level general purpose programming language with data parallel extensions that is configured for execution on one or more data parallel compute nodes, the co-map communication operator being configured to receive as inputs (i) an input indexable type in a first index space and (ii) a function that operates on the first index space, and to transform the input indexable type into an output indexable type in a second index space based on the function, wherein the input indexable type and the output indexable type are data types that implement one or more subscript operators along with a rank, wherein the co-map communication operator is configured to be fully composable with other communication operators by being configured to be specified with each of the following transformations: a first transformation that maps the second index space to first index space, a second transformation that transforms an offset into the input indexable type into an offset into the output indexable type, a third transformation that transforms an extent of the input indexable type into an extent of the output indexable type, and a fourth transformation that transforms the extent of the output indexable type into the extent of the input indexable type, and wherein the co-map communications operator comprises a 'swap' communications operator that includes an index transformation that swaps dimensions of the input indexable type to transform the input indexable type into the output indexable type; and applying the co-map communication operator to the input indexable type, including mapping the input indexable type to the output indexable type by applying the function to the first index space, thereby lifting the function from a function that operates on an index space to a function that operates on an indexable type.

16. The computer system of claim 15, wherein the data parallel source code is configured for execution on one or more data parallel compute nodes that include at least one graphics processing unit.

* * * * *